United States Patent
Okada et al.

(10) Patent No.: US 8,210,786 B2
(45) Date of Patent: Jul. 3, 2012

(54) FASTENING DEVICE

(75) Inventors: Shigeo Okada, Kanagawa (JP); Kouichi Kato, Kanagawa (JP)

(73) Assignee: Piolax Inc., Yokohama-Shi, Kanagawa (JP)

( * ) Notice: Subject to any disclaimer, the term of this patent is extended or adjusted under 35 U.S.C. 154(b) by 570 days.

(21) Appl. No.: 11/987,916

(22) Filed: Dec. 5, 2007

(65) Prior Publication Data

US 2008/0159824 A1 Jul. 3, 2008

(30) Foreign Application Priority Data

Dec. 6, 2006 (JP) ................................ P2006-329500

(51) Int. Cl.
  *F16B 21/18* (2006.01)
(52) U.S. Cl. .......................... 411/526; 411/523; 411/437
(58) Field of Classification Search .................. 411/112, 411/173, 182, 437, 525–527, 970, 520, 522, 411/523
  See application file for complete search history.

(56) References Cited

U.S. PATENT DOCUMENTS

| 2,399,957 A * | 5/1946 | Tinnerman | 411/173 |
| 2,400,545 A * | 5/1946 | Kost | 411/527 |
| 2,539,172 A * | 1/1951 | Andrews | 248/27.3 |
| 3,673,911 A * | 7/1972 | Ramillon | 411/533 |
| 4,728,236 A * | 3/1988 | Kraus | 411/437 |
| 4,999,019 A * | 3/1991 | Kraus | 411/512 |
| 5,707,193 A * | 1/1998 | Hasegawa | 411/433 |
| 6,997,662 B2 | 2/2006 | Nishikawa | |
| D576,481 S * | 9/2008 | Kato et al. | D8/397 |
| 7,645,107 B2 | 1/2010 | Yoneoka | |

FOREIGN PATENT DOCUMENTS

| JP | 4-277310 | 10/1992 |
| JP | 5-32811 | 4/1993 |
| JP | 7-41042 | 7/1995 |
| JP | 2000-238585 | 9/2000 |
| JP | 2004-69004 | 3/2004 |
| JP | 2005-76646 | 3/2005 |
| JP | 2005-83460 | 3/2005 |
| JP | 2006-308020 | 11/2006 |

OTHER PUBLICATIONS

Japanese Office Action dated May 11, 2010 with English language translation thereof.
Japanese Office Action dated Dec. 14, 2010 with English translation.

* cited by examiner

*Primary Examiner* — Flemming Saether
(74) *Attorney, Agent, or Firm* — McGinn IP Law Group, PLLC (57) ABSTRACT

A fastening device for fixing a member to be fixed to a fixing member through a screw, the fastening device includes: a top plate portion; and a pair of leg piece portions respectively suspended from the two side edges of the top plate portion, wherein the top plate portion includes two pairs of first elastic securing pieces disposed opposed to each other for defining a first screw hole formed in the screw, and two pairs of regulating pieces respectively interposed between the first elastic securing pieces for defining a first guide hole having a diameter larger than the first screw hole.

9 Claims, 6 Drawing Sheets

FASTENING DEVICE

BACKGROUND OF THE INVENTION

1. Field of the Invention

The present invention relates to a fastening device for fixing, for example, a car trim to a body panel through a screw.

2. Description of the Related Art

Conventionally, this kind of fastening device, although not shown specifically, is molded of an elastic metal thin plate such as a spring steel plate into an integral body which includes a top plate portion having a flat plate shape and a pair of leg piece portions respectively suspended from the two side edges of the top plate portion and having a U-like shape. Specifically, the top plate portion includes a nut hole which is formed in the central portion thereof and also into which a screw can be threadedly engaged; and, the leg piece portion is structured such that the inner piece thereof is inwardly greatly inclined, whereas the outer piece thereof includes a securing shoulder portion to be secured to the hole edge of a mounting hole opened up in the body panel, as disclosed in JP-A-2000-238585.

And, when fixing the car trim to the body panel actually, firstly, the leg piece portions of the fastening device are respectively inserted into the mounting hole of the body panel with the aid of the flexing of the outer piece, and the securing shoulder portions of the outer pieces of the respective leg piece portions are respectively secured to the hole edge of the mounting hole of the body panel from the back surface side. After then, while the top plate portion of the fastening device is pressed against the back surface of the car trim in such a manner that its through hole coincides with the nut hole, the leading end of the screw is inserted from the through hole of the car trim to thereby bring the screw into threaded engagement with the nut hole of the top plate portion. As a result of this, the pair of leg piece portions is caused to spread outwardly due to the shape of the inner piece thereof, whereby the car trim can be fixed to the body panel.

SUMMARY OF THE INVENTION

In the conventional fastening device, when fixing the car trim to the body panel, the screw must be threadedly engaged with the nut hole of the top plate portion while rotating the screw bit by bit. However, this tends to make the fixing operation unnecessarily difficult.

The present invention is developed to solve effectively the problems found in the conventional fastening device. Specifically, according to a first aspect of the invention, there is provided a fastening device for fixing a member to be fixed to a fixing member through a screw, including: a top plate portion; and, a pair of leg piece portions respectively suspended from the two side edges of the top plate portion, wherein the top plate portion includes two pairs of first elastic securing pieces disposed opposed to each other for defining a first screw hole formed in the screw, and two pairs of regulating pieces respectively interposed between the first elastic securing pieces for defining a first guide hole having a diameter larger than the first screw hole.

According to a second aspect of the invention according to the first aspect of the invention, the two pairs of first elastic securing pieces are respectively extended on diagonal lines from the vicinity of the suspending positions of the respective leg piece portions of the top plate portion.

According to a third aspect of the invention according to the first or second aspect of the invention, the pair of leg piece portions respectively includes second elastic securing pieces disposed in the lower end portions of the leg piece portions and opposed to each other for defining a second screw hole.

According to a fourth aspect of the invention, there is provided a fastening device for fixing a member to be fixed to a fixing member through a screw, including: a top plate portion; and, a pair of leg piece portions respectively suspended from the two side edges of the top plate portion, wherein the top plate portion includes two pairs of first elastic securing pieces disposed opposed to each other for defining a first screw hole formed in the screw, and two pairs of regulating pieces respectively interposed between the first elastic securing pieces for defining a first guide hole having a diameter larger than the first screw hole; the pair of leg piece portions respectively include second elastic securing pieces disposed in the lower end portions of the leg piece portions and opposed to each other for defining a second screw hole, and two pairs of second regulating pieces disposed in the two sides of the respective second elastic securing pieces for defining a second guide hole having a diameter than the second screw hole; and, the two pairs of elastic securing pieces are respectively extended on diagonal lines from the vicinity of the suspending positions of the respective leg piece portions of the top plate portion.

According to a fifth aspect of the invention according to the fourth aspect of the invention, the second regulating pieces are respectively bent obliquely outward toward the top plate portion.

According to a sixth aspect of the invention according to the fifth aspect of the invention, leading end portions of a pair of the two pairs of second regulating pieces are connected together, and leading end portions of another pair of the two pairs of second regulating pieces are connected together.

According to a seventh aspect of the invention according to any one of the first to sixth aspect of the invention, the two sides of the two first regulating pieces situated on the side of the pair of leg piece portions are separated from their associated leg piece portions through their associated slits, while the dimension between the upper ends of the pair of leg piece portions as well as the dimension between the two first regulating pieces are respectively set larger than the mounting hole of the fixing member.

According to an eighth aspect of the invention according to the seventh aspect of the invention, the two first regulating pieces respectively include check pawls to be secured to the hole edge of the mounting hole of the fixing member.

According to the first aspect of the invention, when inserting the screw into the first screw hole defined by the two pairs of first elastic securing pieces, without rotating the screw as in the conventional fastening device, the screw can be inserted linearly because the two pairs of first elastic securing pieces are easily flexed, and also, in the screw insertion operation, the insertion attitude of the screw can be regulated by the first guide defined by the first regulating pieces. Therefore, when the fastening device of the invention is compared with the conventional fastening device, the efficiency of the fixing operation can be enhanced greatly.

According to the second aspect of the invention, since the two pairs of first elastic securing pieces are extended on the diagonal lines, the length dimensions of the respective first elastic securing pieces can be set as long as possible. This can facilitate the flexing of the first elastic securing pieces and thus can reduce the insertion force of the screw.

According to the third aspect if the invention, since the second elastic securing pieces for defining the second screw hole are set on the side of the pair of leg piece portions as well, the screw can be supported by the first and second screw holes formed in upper and lower two positions. This not only can effectively prevent the screw from loosening but also can facilitate the flexing of the second elastic securing pieces to thereby allow the linear insertion of the screw. Therefore, the efficiency of the fixing operation can be enhanced.

According to the fourth aspect of the invention, similarly to the first aspect of the invention, when inserting the screw into the first screw hole defined by the two pairs of first elastic securing pieces, without rotating the screw as in the conventional fastening device, the screw can be inserted linearly because the two pairs of first elastic securing pieces are easily flexed, and also, in the screw insertion operation, the insertion attitude of the screw can be regulated by the first guide defined by the first regulating pieces. Therefore, when the fastening device of the invention is compared with the conventional fastening device, the efficiency of the fixing operation can be enhanced greatly. Also, since the second elastic securing pieces for defining the second screw hole are set on the side of the pair of leg piece portions as well, the screw can be supported by the first and second screw holes formed in upper and lower two positions. This not only can effectively prevent the screw from loosening but also can facilitate the flexing of the second elastic securing pieces to thereby allow the linear insertion of the screw. Therefore, the efficiency of the fixing operation can be enhanced. Further, the insertion attitude of the screw can be regulated also by the second guide hole to be defined by the second regulating pieces. In addition, when viewed from the screw insertion direction, the second elastic securing pieces are interposed between the first elastic securing pieces and the second regulating pieces are interposed between the first regulating pieces. Owing to this, the respective regulating pieces are allowed to act on the screw from the entire periphery of the screw, thereby being able to regulate the screw insertion attitude uniformly; and, the respective elastic securing pieces are allowed to act on the screw from the entire periphery of the screw, whereby the secured state of the screw can be obtained uniformly.

According to the fifth aspect of the invention, since the second regulating pieces are respectively bent obliquely outward toward the top plate portion, the second regulating pieces are allowed to exist upwardly of the second screw hole which is defined by the second elastic securing pieces. This can ensure that a regulating action to regulate the insertion attitude of the screw can be obtained positively.

According to the sixth aspect of the invention, since the bent leading end portions of the two pairs of regulating pieces are connected together on their respective sides, not only the regulation block can be spread but also the rigidity of the second regulating pieces themselves can be enhanced.

According to the seventh aspect of the invention, since the dimension between the upper ends of the pair of leg piece portions as well as the dimension between the two first regulating pieces, which are respectively separated from their associated leg piece portions through their associated slits, are respectively set larger than the mounting hole of the fixing member, simply by pressure inserting the fastening device itself into the mounting hole of the fixing member, the fastening device can be mounted. This can eliminate the need to spread a pair of leg piece portions using a screw as in the conventional fastening device. Thus, the insertion force of the screw can be reduced in this respect as well.

According to the eighth aspect of the invention, since the two first regulating pieces respectively include the check pawls, there is no fear that the fastening device can be removed from the mounting hole of the fixing member.

BRIEF DESCRIPTION OF THE DRAWINGS

These and other objects and advantages of this invention will become more fully apparent from the following detailed description taken with the accompanying drawings in which.

DETAILED DESCRIPTION OF THE EMBODIMENTS

According to the present invention, there is provided a fastening device for fixing a member to be fixed to a fixing member through a screw, including: a top plate portion; and, a pair of leg piece portions respectively suspended from the two side edges of the top plate portion, wherein the top plate portion includes two pairs of first elastic securing pieces disposed opposed to each other for defining a first screw hole formed in the screw, and two pairs of regulating pieces respectively interposed between the first elastic securing pieces for defining a first guide hole having a diameter larger than the first screw hole. According to this structure, when inserting the screw into the first screw hole which is defined by the two pairs of first elastic securing pieces, without rotating the screw, by flexing the first elastic securing pieces respectively, the screw can be inserted linearly into the first screw hole. This can facilitate the insertion operation of the screw.

Figure 1A:
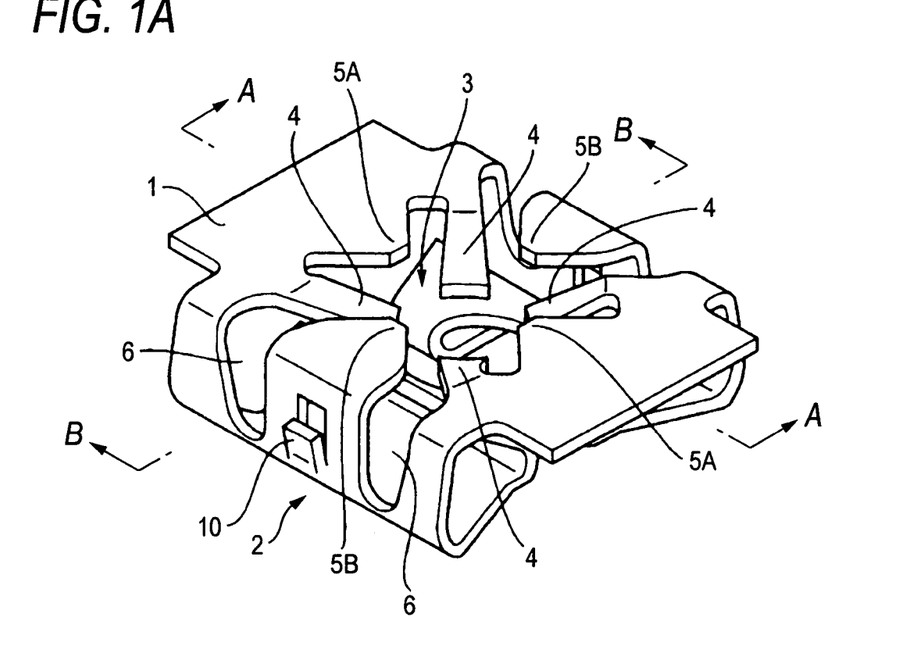
FIG. 1A is a perspective view of a fastening device according to an embodiment of the invention, when viewed from the front side thereof.
Figure 1B:
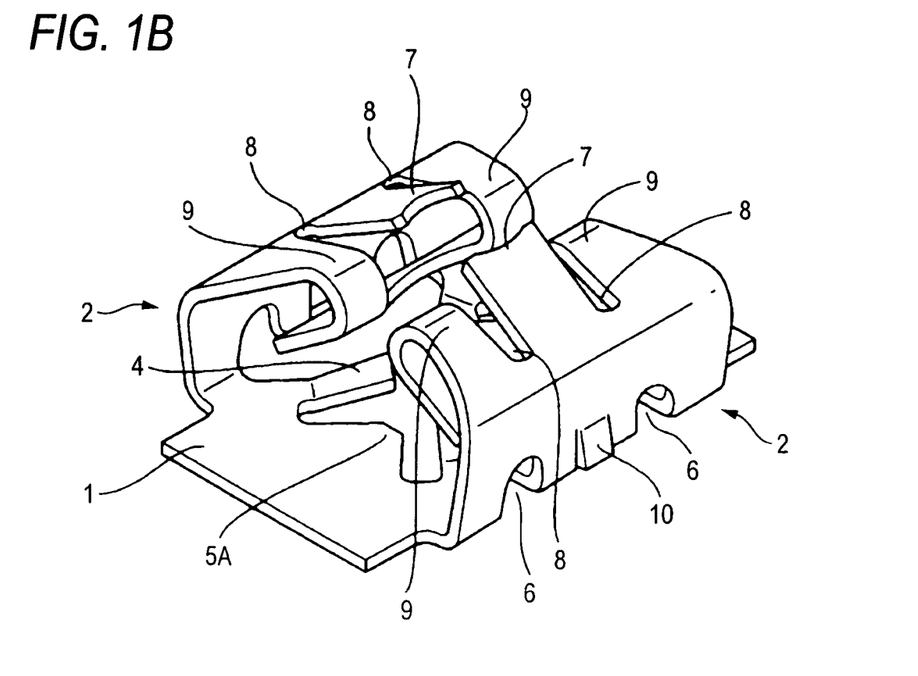
FIG. 1B is a perspective view of the fastening device, when viewed from the back side thereof.
Figure 2A:
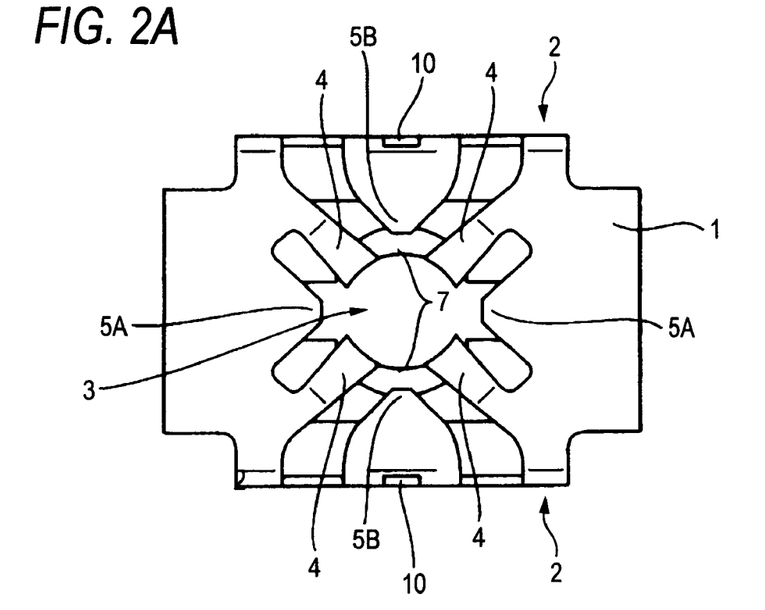
FIG. 2A is a plan view of the fastening device.
Figure 2B:
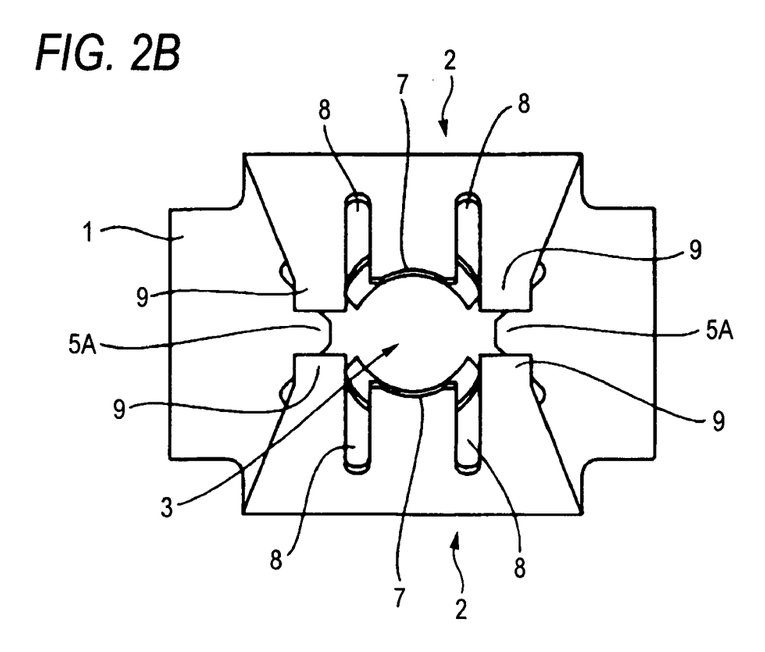
FIG. 2B is a bottom view of the fastening device.
Figure 2C:
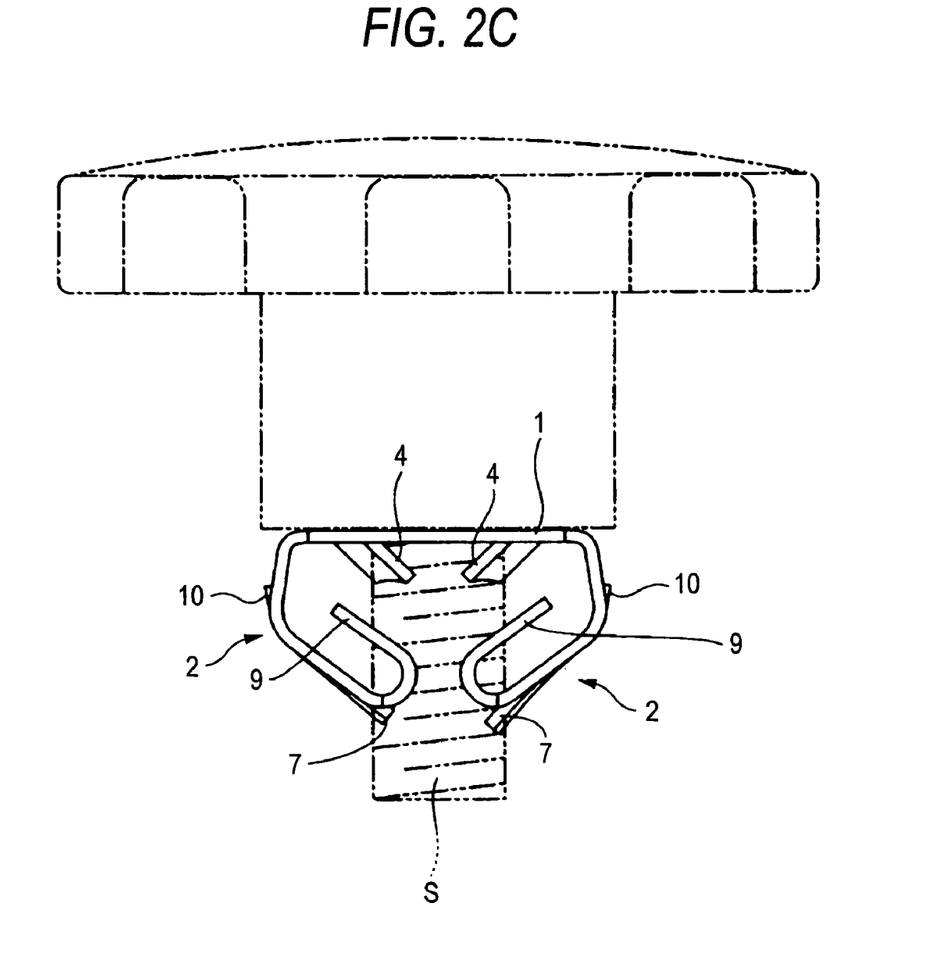
FIG. 2C is a side view of the fastening device.
Figure 3A:
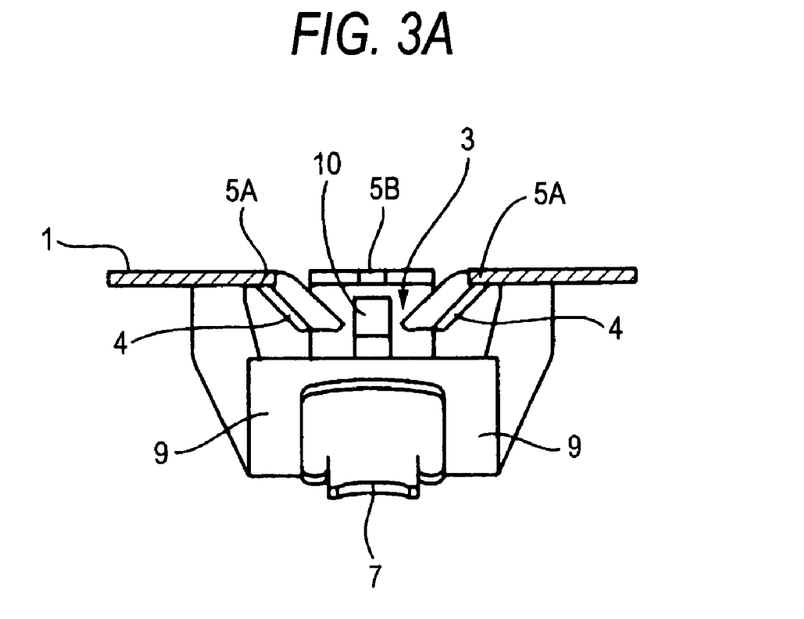
FIG. 3A is a section view taken along the A-A line shown in FIG. 1A.
Figure 3B:
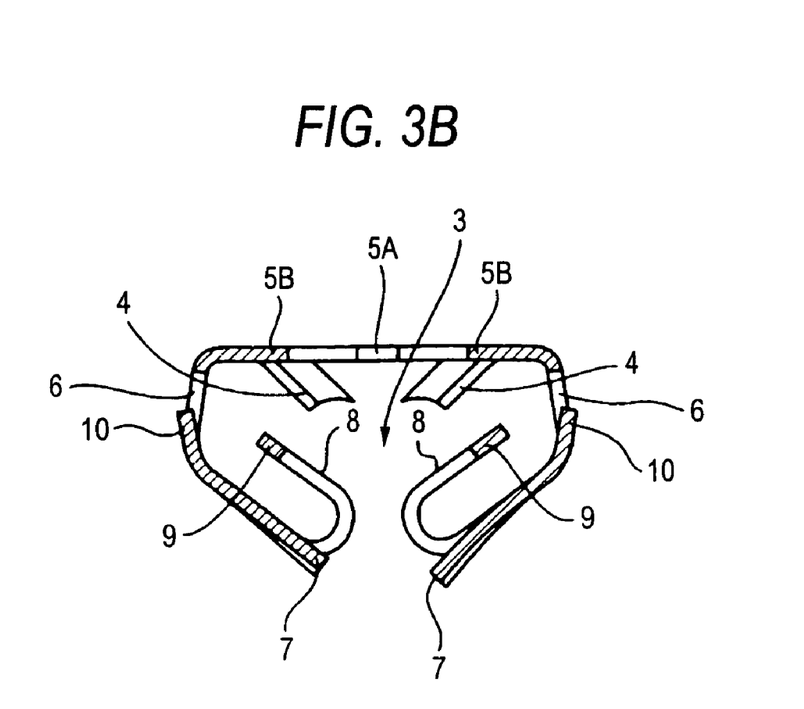
FIG. 3B is a section view taken along the B-B line shown in FIG. 1A.

Now, description will be given below in detail of the invention with reference to a preferred embodiment thereof shown in the accompanying drawings. A fastening device according to the present embodiment as well, basically, similarly to the above-mentioned conventional fastening device, is molded of an elastic metal thin plate such as a spring steel plate into an integral body and, as shown in FIGS. 1A and 1B, includes a top plate portion 1 and a pair of leg piece portions 2 respectively suspended from the two side edges of the top plate portion 1.

And, referring to the structure of the top plate portion 1 having a flat plate shape, as shown in FIGS. 2A, 2B, 2C, 3A and 3B as well, the portion of the top plate portion 1 that exists in the vicinity of the intermediate portion of the top plate portion 1 from which the respective side leg piece portions 2 are suspended is cut out to thereby provide a cut-out portion 3. And thus, the top plate portion 1 includes: two pairs of first elastic securing pieces 4 which are respectively disposed on the diagonal lines of the cut-out portion 3, are opposed to each other, and are extended slantingly downward for defining the first screw hole of the screw; and, two pairs of regulating pieces 5A and 5B which are interposed between the respective first elastic securing pieces 4 for defining a first guide hole having a diameter larger than the first screw hole. Especially, as regards the first regulating pieces 5A and 5B, one pair of first regulating pieces 5A continue horizontally in a triangular shape from the remaining portions of the two ends of the top plate portion 1, whereas the other pair of first regulating pieces 5B part and rise from their associated leg piece portions 2 through slits 6 continuing from the cut-out portion 3, and the leading end portions of the regulating pieces 5B are bent to enter the cut-out portion 3 in a triangular shape.

Referring now to the structure of the leg piece portions 2, as shown in FIGS. 2A, 2B, 2C, 3A and 3B as well, the upper end portions of the leg piece portions 2 are respectively suspended from the top plate portion 1 so as to spread gradually, although slightly; the lower end portions are bent obliquely outward toward the top plate portion 1 while slanting inwardly; in the inwardly slanting lower end portions, there are provided a pair of second elastic securing pieces 7 through their associated slits 8 such that the second elastic securing pieces 7 are disposed opposed to each other and cooperate together in defining the second screw hole of the screw; and, the obliquely outward bent two side portions are formed as two pairs of second regulating pieces 9 for defining a second guide hole having a diameter larger than the second screw hole. Here, the bent leading end portions of the two pairs of second regulating pieces 9 are connected together on their respective sides.

Also, the other pair of first regulating pieces 5B as well, similarly to the upper end portions of the leg piece portions 2, have a shape to spread gradually although slightly and employ a structure in which the dimension between the upper ends of the pair of leg piece portions 2 as well as the dimension between the two first regulating pieces 5B are set larger than a mounting hole H2 to be formed in a body panel P2 (both of which will be discussed later). Further, in the other pair of first regulating pieces 5B, there are provided check pawls 10 which can be secured to the hole edge of the mounting hole H2 of the body panel P2.

Figure 4:
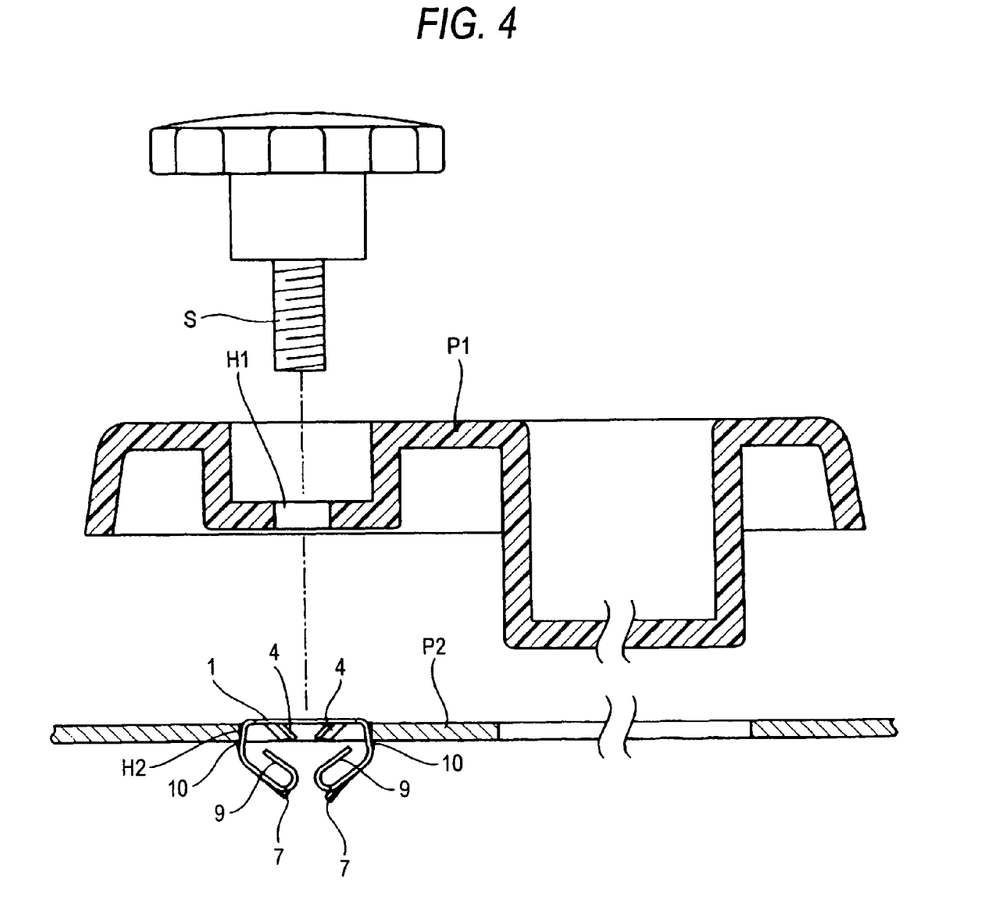
FIG. 4 is a section view to show a state where the fastening device is mounted on a body panel.

Thus, when fixing a car trim P1 serving as a member to be fixed to the body panel P2 serving as a fixing member using the above-structured fastening device, firstly, as shown in FIG. 4, the fastening device itself is mounted into the mounting hole H2 that is previously opened up in the body panel P2. In this case, as described before, since the dimension between the upper ends of the pair of leg piece portions 2 as well as the dimension between the two first regulating pieces 5B are set larger than the mounting hole H2 of the body panel P2, even when the pair of leg piece portions 2 are not forcibly spread using a screw as in the conventional fastening device, simply by pressure inserting the respective leg piece portions 2 of the present fastening device into the mounting hole H2 of the body panel P2, the fastening device can be positively mounted onto the body panel P2. Also, in this mounted state, since the check pawls 10 respectively provided on the other pair of first regulating pieces 5B are secured to the hole edge of the mounting hole H2 of the body panel P2, removal of the fastening device itself from the body panel P2 can also be prevented effectively.

Then, while pressing the car trim 1 against the body panel P2 in such a manner that its through hole H1 and the first screw hole of the top plate portion 1 coincide with each other, when a screw S is inserted from the through hole H1 of the car trim P1 into the first screw hole of the top plate portion 1 defined by the first elastic securing pieces 4, the screw S is inserted while the insertion attitude thereof is being regulated by the first guide hole defined by the first regulating pieces 5A and 5B. In this case, since, owing to the insertion of the screw S, the two pairs of first elastic securing pieces 4 for defining the first screw hole are easily flexed downward to thereby allow the linear insertion of the screw S, thereby being able to completely eliminate the need to rotate the screw S, which has been inevitable in the conventional fastening device.

Also, since the two pairs of first elastic securing pieces 4, as described above, are disposed on the diagonal lines of the cut-out portion 3 of the top plate portion 1, the length dimensions of the respective first elastic securing pieces 4 can be made as large as possible. That is, the first elastic securing pieces 4 are easier to flex, which can reduce the insertion force of the screw S.

Next, the screw S is inserted into the second screw hole of the leg piece portion 2 which is defined by the second elastic securing pieces 7. In this case as well, while the insertion attitude of the screw S is being regulated by the second guide hole defined by the second regulating pieces 9, due to the easy flexing of the second elastic securing pieces 7, the screw S can be inserted linearly. This also can eliminate the rotation of the screw S completely. In this case, since the lower end portions of the second regulating pieces 9 are bent obliquely outward toward the top plate portion 1, the second regulating pieces 9 are allowed to exist upwardly of the second screw hole which is defined by the second elastic securing pieces 7. This makes it possible to positively obtain a regulating action to regulate the insertion attitude of the screw S.

Figure 5:
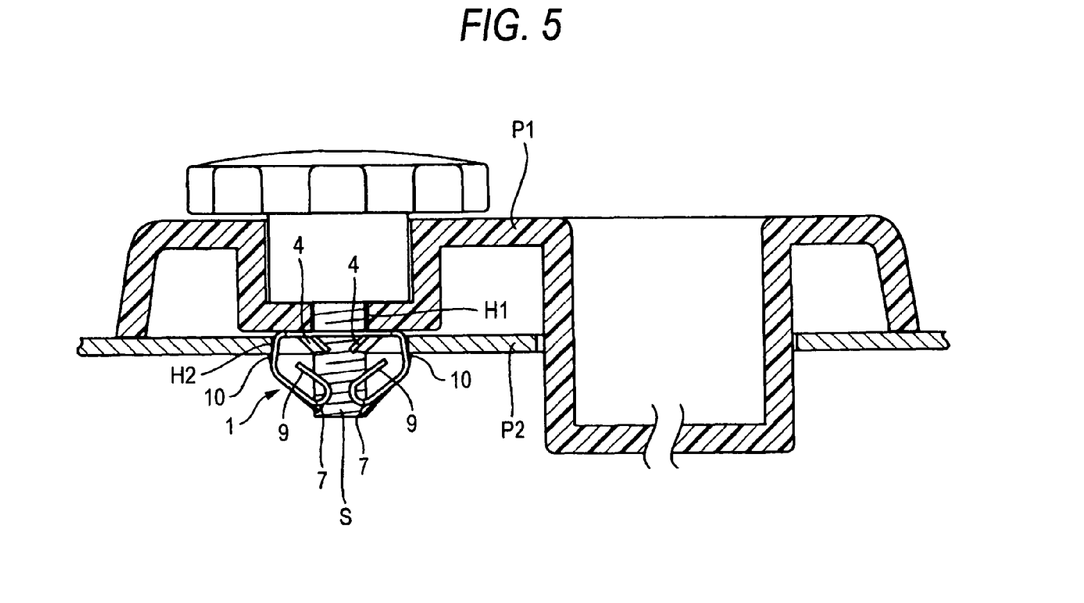
FIG. 5 is a section view to shown a state where a car trim is fixed to the body panel using the fastening device and a screw.

Finally, since the leading end portions of the first and second elastic securing pieces 4 and 7 cooperating together in defining the first and second screw holes are secured to the screw surface of the screw S, as shown in FIG. 5, the car trim P1 can be fixed to the body panel P2 positively. Therefore, when the present embodiment is compared with the conventional fastening device, since there is eliminated the need for an operation to rotate the screw S, the efficiency of the fixing operation can be enhanced greatly. Also, according to the present embodiment, because the screw holes to be defined by the first and second elastic securing pieces 4 and 7 are formed in the two upper and lower portions, the screw S can be prevented from loosening.

According to the present embodiment, since the second securing pieces 9 are disposed on the two sides of the elastic securing pieces 7, when the present embodiment is viewed from the insertion direction of the screw S, the second securing pieces 7 are interposed between the first elastic securing pieces 4 and the second regulating pieces 9 are interposed between the first regulating pieces 5A and 5B. Therefore, the first and second regulating pieces 5A and 5B are allowed to act onto the screw S from the entire periphery thereof, whereby the insertion attitude of the screw S can be regulated uniformly; and, at the same time, the first and second elastic securing pieces 4 and 7 are allowed to act onto the screw S from the entire periphery thereof, whereby the uniform secured state of the screw S can be provided.

Also, especially, as regards the second regulating pieces 9 which are used to define the second guide hole, since the bent leading end portions thereof are connected together on their respective sides, not only the regulating block thereof can be spread but also the rigidity of the second regulating pieces 9 themselves can be enhanced.

On the other hand, to remove the car trim P1 from the body panel P2, when the screw S is rotated in a given direction using the knob portion of the screw S, the car trim P1 can be removed from the body panel P2 immediately.

According to the fastening device of the invention, when inserting the screw into the first screw hole to be defined by the two pairs of elastic securing pieces, without rotating the screw, by flexing the first elastic securing pieces, the screw can be inserted linearly, thereby being able to facilitate the insertion operation of the screw. Therefore, the present fastening device can be applied very effectively to a case where a car trim is fixed to a body panel.

What is claimed is:

1. A fastening device for fixing a member to be fixed to a fixing member through a screw, the fastening device comprising:

a top plate portion, and a pair of leg piece portions respectively suspended from two side edges of the top plate portion, wherein the top plate portion includes two pairs of first elastic securing pieces disposed opposed to each other for defining a first screw hole formed in the top plate portion, and two pairs of first regulating pieces respectively interposed between the first elastic securing pieces for defining a first guide hole comprising a diameter greater than a diameter of the first screw hole, wherein the pair of leg piece portions respectively include second regulating pieces disposed in lower end portions of the pair of leg piece portions and opposed to each other for defining a second guide hole, wherein, among the second regulating pieces, leading end portions of the second regulating pieces on one of the side edges of the top plate portion are connected together to form a connection portion, and leading end portions of the second regulating pieces on an other of the side edges of the top plate portion are connected together to form another connection portion, and wherein each of the connection portions and the respective second regulating pieces continuously define the second guide hole.

2. The fastening device according to claim 1, wherein the two pairs of first elastic securing pieces are respectively extended on diagonal lines from a vicinity of suspending positions of respective leg piece portions of the pair of leg piece portions of the top plate portion.

3. The fastening device according to claim 1, wherein the pair of leg piece portions respectively include second elastic securing pieces disposed in the lower end portions of the pair of leg piece portions and opposed to each other for defining a second screw hole.

4. The fastening device according to claim 1, wherein two sides of two first regulating pieces of the two pairs of first regulating pieces situated on a side of the pair of leg pieces portions are separated from an associated leg piece portion of the pair of leg piece portions through slits, while a dimension between upper ends of the pair of leg piece portions as well as a dimension between the two first regulating pieces of the two pairs of first regulating pieces are respectively set larger than a dimension of a mounting hole of the fixing member.

5. The fastening device according to claim 4, wherein the two first regulating pieces of the two pairs of first regulating pieces respectively include check pawls to be secured to a hole edge of the mounting hole of the fixing member.

6. A fastening device for fixing a member to be fixed to a fixing member through a screw, the fastening device comprising:

a top plate portion; and a pair of leg piece portions respectively suspended from two side edges of the top plate portion, wherein the top plate portion includes two pairs of first elastic securing pieces disposed opposed to each other for defining a first screw hole formed in the top plate portion, and two pairs of first regulating pieces respectively interposed between the two pairs of first elastic securing pieces for defining a first guide hole comprising a diameter greater than a diameter of the first screw hole, wherein the pair of leg piece portions respectively include second elastic securing pieces disposed in lower end portions of the pair of leg piece portions and opposed to each other for defining a second screw hole, and two pairs of second regulating pieces disposed in two sides of the respective second elastic securing pieces for defining a second guide hole comprising a diameter greater than a diameter of the second screw hole, wherein the two pairs of first elastic securing pieces are respectively extended on diagonal lines from a vicinity of suspending positions of the respective leg piece portions of the pair of leg piece portions of the top plate portion, wherein the two pairs of second regulating pieces are respectively bent obliquely outward toward the top plate portion, wherein leading end portions of a pair of the two pairs of second regulating pieces are connected together, and wherein leading end portions of an other pair of the two pairs of second regulating pieces are connected together.

7. The fastening device according to claim 6, wherein two sides of two first regulating pieces of the two pairs of first regulating pieces situated on a side of the pair of leg pieces portions are separated from an associated leg piece portion of the pair of leg piece portions through slits, while a dimension between upper ends of the pair of leg piece portions as well as a dimension between the two first regulating pieces of the two pairs of first regulating pieces are respectively set larger than a dimension of a mounting hole of the fixing member.

8. The fastening device according to claim 7, wherein the two first regulating pieces of the two pairs of first regulating pieces respectively include check pawls to be secured to a hole edge of the mounting hole of the fixing member.

9. A fastening device for fixing a member to be fixed to a fixing member through a screw, the fastening device comprising:

a top plate portion; and a pair of leg piece portions respectively suspended from two side edges of the top plate portion, wherein the top plate portion includes two pairs of first elastic securing pieces disposed opposed to each other for defining a first screw hole formed in the top plate portion, and two pairs of first regulating pieces respectively interposed between the two pairs of first elastic securing pieces for defining a first guide hole comprising a diameter greater than a diameter of the first screw hole, wherein the pair of leg piece portions respectively include second elastic securing pieces disposed in lower end portions of the pair of leg piece portions and opposed to each other for defining a second screw hole, and two pairs of second regulating pieces disposed in two sides of the respective second elastic securing pieces for defining a second guide hole comprising a diameter greater than a diameter of the second screw hole, wherein the two pairs of first elastic securing pieces are respectively extended on diagonal lines from a vicinity of positions where the respective leg piece portions are suspended, wherein, as viewed from a direction of inserting the screw, each of the second elastic securing pieces is disposed between corresponding two pieces of the two pairs of first elastic securing pieces, and wherein, as viewed from the direction of inserting the screw, each piece of the two pairs of second regulating pieces is disposed between corresponding two pieces of the two pairs of first regulating pieces.

* * * * *